US008497918B2

(12) United States Patent
Miyasako (10) Patent No.: US 8,497,918 B2
(45) Date of Patent: Jul. 30, 2013

(54) IMAGE CAPTURE APPARATUS AND CONTROL METHOD THEREOF

(75) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/163,291

(22) Filed: Jun. 17, 2011

(65) Prior Publication Data
US 2011/0317024 A1 Dec. 29, 2011

(30) Foreign Application Priority Data

Jun. 29, 2010 (JP) ................. 2010-148028

(51) Int. Cl.
*H04N 5/232* (2006.01)
*G03B 5/00* (2006.01)
(52) U.S. Cl.
USPC ........................ 348/208.99; 396/55
(58) Field of Classification Search
USPC ............. 348/208.99–208.5; 396/55
See application file for complete search history.

(56) References Cited

U.S. PATENT DOCUMENTS

| 5,825,415 | A * | 10/1998 | Kaneda et al. | 348/208.6 |
| 6,208,377 | B1 * | 3/2001 | Morofuji et al. | 348/208.8 |
| 2002/0047906 | A1 | 4/2002 | Ohta | |
| 2009/0225174 | A1 * | 9/2009 | Handa et al. | 348/208.3 |
| 2009/0251547 | A1 * | 10/2009 | Hatanaka | 348/208.3 |
| 2010/0158493 | A1 * | 6/2010 | Miyasako | 396/55 |

FOREIGN PATENT DOCUMENTS

| CN | 1812501 A | 8/2006 |
| CN | 101753845 A | 6/2010 |
| JP | 11-187308 | 7/1999 |

OTHER PUBLICATIONS

Information Processing Society of Japan, Morio Onoe, et al., vol. 17, No. 7, p. 634-640, Jul. 1976 ( with English Translation).
The above references were cited in a May 10, 2013 Chinese Office Action, which is enclosed with English Translation, that issued in Chinese Patent Application No. 201110184510.5.

* cited by examiner

*Primary Examiner* — Anthony J Daniels
*Assistant Examiner* — Selam Gebriel
(74) *Attorney, Agent, or Firm* — Cowan, Liebowitz & Latman, P.C.

(57) ABSTRACT

An image capture apparatus comprises a shake detection unit which detects a shake of the image capture apparatus; a motion vector detection unit which detects a motion vector indicating a movement of an image; a first calculation unit which calculates a first shake correction amount; a second calculation unit which calculates a second shake correction amount; a shake correction unit which optically corrects a blur of a captured image; a panning determination unit which determines that the image capture apparatus performs a panning operation; a determination unit which determines whether or not the image capture apparatus is in a constant point capturing state; and a control change unit which changes the first threshold to a second threshold and amplifies the second shake correction amount when the determination unit determines the constant point capturing state.

11 Claims, 9 Drawing Sheets

IMAGE CAPTURE APPARATUS AND CONTROL METHOD THEREOF

BACKGROUND OF THE INVENTION

1. Field of the Invention

The present invention relates to an image capture apparatus which has a function of optically correcting a blur of a captured image caused by, for example, camera shake, and a control method thereof.

2. Description of the Related Art

In recent years, with attention being focused on the fact that shake of an image capture apparatus constitutes a major cause in quality degradation in captured images along with size reductions of the image capture apparatus and increases in magnification of an optical system, various blur correction functions that correct blur in captured images caused by such camera shake have been proposed.

Control of a blur correction system when panning is disclosed in, for example, Japanese Patent Laid-Open No. 11-187308, and is effective as blur correction control during panning states since it can suppress blur correction in low-frequency ranges and attain blur correction in high-frequency ranges.

However, the conventional blur correction functions shown in Japanese Patent Laid-Open No. 11-187308 pose the following problem.

In the conventional panning control, when a signal that represents shake is greater than or equal to a predetermined threshold, a panning state is determined to execute the panning control. However, with this method, when the user causes a large camera shake, the signal that represents a shake exceeds the predetermined threshold even in a capturing state without panning, and the panning state is determined incorrectly. Hence, even in a fixed point capturing state (a capturing state of a fixed object without any panning), the panning state is determined, and a large residual shake state may be continued.

SUMMARY OF THE INVENTION

The present invention has been made in consideration of the aforementioned problems, and provides an apparatus or method, which automatically determines whether or not the user is performing a fixed point capturing operation, and executes control optimal for the fixed point capturing operation, thereby reducing residual shake in low-frequency ranges in the fixed point capturing operation.

According to the first aspect of the present invention, there is provided an image capture apparatus comprising: a shake detection unit which detects a shake of the image capture apparatus; a motion vector detection unit which detects a motion vector indicating a movement of an image from a captured image signal; a first calculation unit which calculates a first shake correction amount based on an output from the shake detection unit; a second calculation unit which calculates a second shake correction amount based on an output from the motion vector detection unit; a shake correction unit which optically corrects a blur of a captured image based on the first shake correction amount and the second shake correction amount; a panning determination unit which determines that the image capture apparatus performs a panning operation when a signal obtained based on the output from the shake detection unit is larger than a first threshold; a determination unit which determines whether or not the image capture apparatus is in a constant point capturing state in which a constant position is captured; and a control change unit which changes the first threshold to a second threshold larger than the first threshold and amplifies the second shake correction amount when the determination unit determines the constant point capturing state.

According to the second aspect of the present invention, there is provided an image capture apparatus comprising: a shake detection unit which detects a shake of the image capture apparatus; a calculation unit which calculates a shake correction amount based on an output from the shake detection unit; a shake correction unit which optically corrects a blur of a captured image based on the shake correction amount; a panning determination unit which determines that the image capture apparatus performs a panning operation when a signal obtained based on the output from the shake detection unit is larger than a first threshold; a determination unit which determines whether or not the image capture apparatus is in a constant point capturing state in which a constant position is captured; and a control change unit which changes the first threshold to a second threshold larger than the first threshold and shifts a cutoff frequency of a high-pass filter included in the calculation unit to a low-frequency side when the determination unit determines the constant point capturing state.

According to the third aspect of the present invention, there is provided an image capture apparatus comprising: a shake detection unit which detects a shake of the image capture apparatus; a calculation unit which calculates a shake correction amount based on an output from the shake detection unit; a shake correction unit which optically corrects a blur of a captured image based on the shake correction amount; a panning determination unit which determines that the image capture apparatus performs a panning operation when a signal obtained based on the output from the shake detection unit is larger than a first threshold; a determination unit which determines whether or not the image capture apparatus is in a constant point capturing state in which a constant position is captured; and a control change unit which changes the first threshold to a second threshold larger than the first threshold and increases a time constant of an integration unit included in the calculation unit when the determination unit determines the constant point capturing state.

According to the fourth aspect of the present invention, there is provided a control method of an image capture apparatus, comprising: a shake detection step of detecting a shake of the image capture apparatus; a motion vector detection step of detecting a motion vector indicating a movement of an image from a captured image signal; a first calculation step of calculating a first shake correction amount based on an output in the shake detection step; a second calculation step of calculating a second shake correction amount based on an output in the motion vector detection step; a shake correction step of optically correcting a blur of a captured image based on the first shake correction amount and the second shake correction amount; a panning determination step of determining that the image capture apparatus performs a panning operation when a signal obtained based on the output in the shake detection step is larger than a first threshold; a determination step of determining whether or not the image capture apparatus is in a constant point capturing state in which a constant position is captured; and a control change step of changing the first threshold to a second threshold larger than the first threshold and amplifying the second shake correction amount when the constant point capturing state is determined in the determination step.

According to the fifth aspect of the present invention, there is provided a control method of an image capture apparatus, comprising: a shake detection step of detecting a shake of the image capture apparatus; a calculation step of calculating a shake correction amount based on an output in the shake detection step; a shake correction step of optically correcting a blur of a captured image based on the shake correction amount; a panning determination step of determining that the image capture apparatus performs a panning operation when a signal obtained based on the output in the shake detection step is larger than a first threshold; a determination step of determining whether or not the image capture apparatus is in a constant point capturing state in which a constant position is captured; and a control change step of changing the first threshold to a second threshold larger than the first threshold and shifting a cutoff frequency of a high-pass filter in the calculation step to a low-frequency side when the constant point capturing state is determined in the determination step.

According to the sixth aspect of the present invention, there is provided a control method of an image capture apparatus, comprising: a shake detection step of detecting a shake of the image capture apparatus; a calculation step of calculating a shake correction amount based on an output in the shake detection step; a shake correction step of optically correcting a blur of a captured image based on the shake correction amount; a panning determination step of determining that the image capture apparatus performs a panning operation when a signal obtained based on the output in the shake detection step is larger than a first threshold; a determination step of determining whether or not the image capture apparatus is in a constant point capturing state in which a constant position is captured; and a control change step of changing the first threshold to a second threshold larger than the first threshold and increasing a time constant of an integration step in the calculation step when the constant point capturing state is determined in the determination step.

Further features of the present invention will become apparent from the following description of exemplary embodiments with reference to the attached drawings.

DESCRIPTION OF THE EMBODIMENTS

Figure 1:
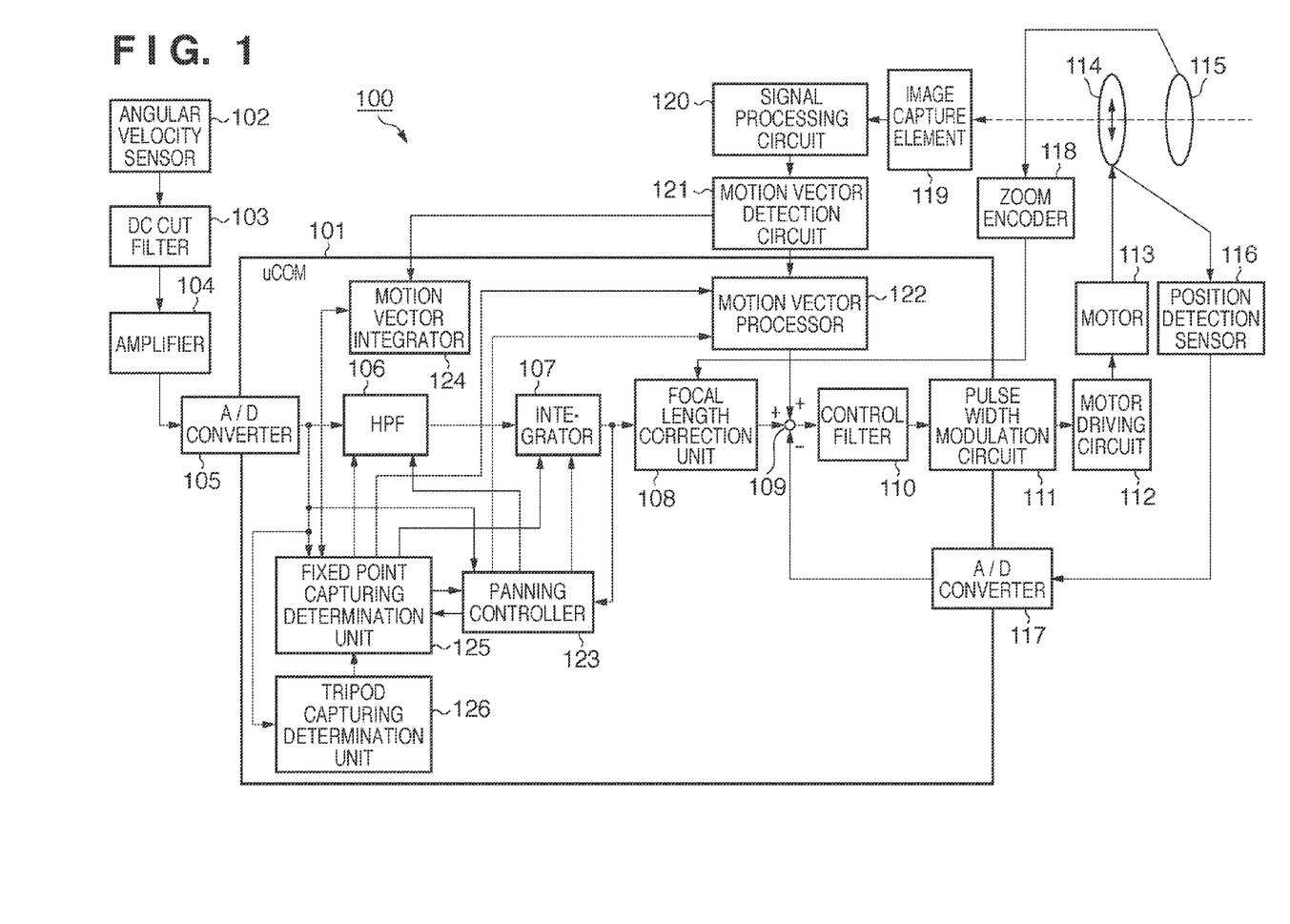
FIG. 1 is a block diagram showing the arrangement of an example of an image capture apparatus which is applicable to the present invention.

Preferred embodiments for carrying out the present invention will be described hereinafter with reference to the drawings. FIG. 1 is a block diagram showing the arrangement of, for example, a video camera as an image capture apparatus according to an embodiment of the present invention.

Respective units of an image capture apparatus 100 shown in FIG. 1 and their exemplary operations will be practically described below. An angular velocity sensor 102 detects a camera shake of the image capture apparatus 100 as an angular velocity signal, and supplies the angular velocity signal to a DC cut filter 103. The DC cut filter 103 cuts off a DC component included in the angular velocity signal from the angular velocity sensor 102, and supplies only AC components of the angular velocity signal, that is, shake components to an amplifier 104. The amplifier 104 amplifies the angular velocity signal from the DC cut filter 103 to an optimal sensitivity, and supplies it to an A/D converter 105. The A/D converter 105 converts the angular velocity signal from the amplifier 104 into digital data, and supplies it as angular velocity data to an HPF 106 included in a μCOM 101.

The HPF 106 has a function capable of varying its characteristics in an arbitrary frequency range, and cuts off low-frequency components included in the angular velocity data from the A/D converter 105 to output a signal of a high-frequency range. An integrator 107, which has a function capable of varying its characteristics in an arbitrary frequency range, integrates the angular velocity data output from the HPF 106, and outputs the integration result as angular displacement data.

A capturing optical system 115 performs, for example, zooming and focusing operations, and forms an object image on an image capture element 119. A zoom encoder 118 detects a zoom position of the capturing optical system 115, and outputs it to a focal length correction unit 108 included in the μCOM 101. The focal length correction unit 108 calculates a focal length of the capturing optical system 115 based on the output from the zoom encoder 118, and calculates a drive amount (gyro-based correction data) of a correction optical system 114 based on the focal length and the output from the integrator 107. The image capture element 119 converts the object image formed by the capturing optical system 115 into an electrical signal as a captured image signal, and supplies it to a signal processing circuit 120. The signal processing circuit 120 generates a video signal compliant with, for example, an NTSC format based on the signal obtained by the image capture element 119, and supplies it to a motion vector detection circuit 121.

The motion vector detection circuit 121 detects a motion vector based on a luminance signal that is included in the video signal from the signal processing circuit 120. More specifically, as a motion vector detection method, for example, a correlation method and block matching method are available. In this embodiment, assume that the motion vector detection circuit 121 adopts the block matching method as an example of the motion vector detection method. This block matching method is as follows. That is, an input image signal is divided into a plurality of blocks each having an appropriate size (for example, 8×8 pixels), and calculates differences from pixels within a predetermined range of a previous field or frame for each block. Then, a block of the previous field or frame, which yields a minimum sum of absolute values of these differences is searched for, and a relative displacement of this block is detected as a motion vector of that block. Note that a detailed description of matching operations in the block matching method will not be given.

A motion vector processor 122 makes, for example, filter operations of motion vector data output from the motion vector detection circuit 121, and calculates that result as motion vector displacement data. That result is used as a drive amount (vector-based correction data) of the correction optical system 114.

An adder/subtractor 109 adds the gyro-based correction data as a correction amount (1st shake correction amount) on the angular velocity sensor 102 side, which is output from the focal length correction unit 108 (first calculation unit) and a correction amount (2nd shake correction amount) on the motion vector detection circuit 121 side, which is output from the motion vector processor 122 (second calculation unit) to output final correction data. Then, the adder/subtractor 109 calculates the final correction data as a drive amount of the correction optical system 114. Also, the adder/subtractor 109 subtracts digital data obtained by A/D-converting the output from a position detection sensor 116, which detects a position of the correction optical system 114, by an A/D converter 117, from the final correction data, and supplies deviation data as a result of the subtraction to a control filter 110. The control filter 110 is configured by an amplifier which amplifies input data by a predetermined gain, and a phase compensation filter.

The deviation data supplied from the adder/subtractor 109 is supplied to the control filter 110, undergoes signal processing using the amplifier and phase compensation filter, and is then output to a pulse width modulation circuit 111. The pulse width modulation circuit 111 modulates the data which is supplied via the control filter 110 into a waveform (that is, a PWM waveform) that changes a duty ratio of pulse waves, and supplies it to a motor driving circuit 112. A motor 113 is a voice coil motor used to drive the correction optical system 114, and is driven by the motor driving circuit 112 to move the correction optical system 114 in a direction perpendicular to an optical axis. The position detection sensor 116 includes a magnet, and a Hall sensor arranged at a position opposing the magnet. The position detection sensor 116 detects a moving amount of the correction optical system 114 in the direction perpendicular to the optical axis, and supplies the detection result to the aforementioned adder/subtractor 109 via the A/D converter 117. Thus, a feedback control system which controls the moving amount of the correction optical system 114 in the direction perpendicular to the optical axis to follow up the aforementioned final correction data is configured.

The correction optical system 114 (correction member) is, for example, a shift lens, and is a correction system which can optically correct a blur by deflecting a direction of the optical axis when it is moved in the direction perpendicular to the optical axis. As a result, an image in which a movement of an object on an image capture plane caused by, for example, a camera shake of the apparatus is corrected is formed on the image capture element 119. The output from the image capture element 119 undergoes predetermined signal processing in the signal processing circuit 120, and is then supplied to the motion vector detection circuit 121.

The processing of the motion vector processor 122 will be described in detail below with reference to the block diagram of FIG. 2. The block diagram of FIG. 2 extracts only blocks related to the motion vector processor 122 from that of FIG. 1, and further shows the internal arrangement of the motion vector processor 122. The same reference numerals in FIG. 2 denote the same blocks as in FIG. 1, and a description thereof will not be repeated.

The motion vector detection circuit 121 detects, as a motion vector, a correction residue generated as a result of blur correction by the correction optical system 114. A motion vector signal indicating the correction residue of the correction optical system 114 undergoes processing such as filter operations by the motion vector processor 122, and is then supplied to the adder/subtractor 109. By the signal supplied to the adder/subtractor 109, the correction optical system 114 is driven in a direction to reduce the correction residue. The correction residue which is reduced as a result of this drive operation is further detected by the motion vector detection circuit 121 as a motion vector, and the correction optical system 114 is driven in the direction to reduce the correction residue again. That is, the block diagram of FIG. 2 configures a feedback loop which detects a correction residue of the correction optical system 114 as a motion vector, and drives the correction optical system 114 to reduce this correction residue.

Figure 2:
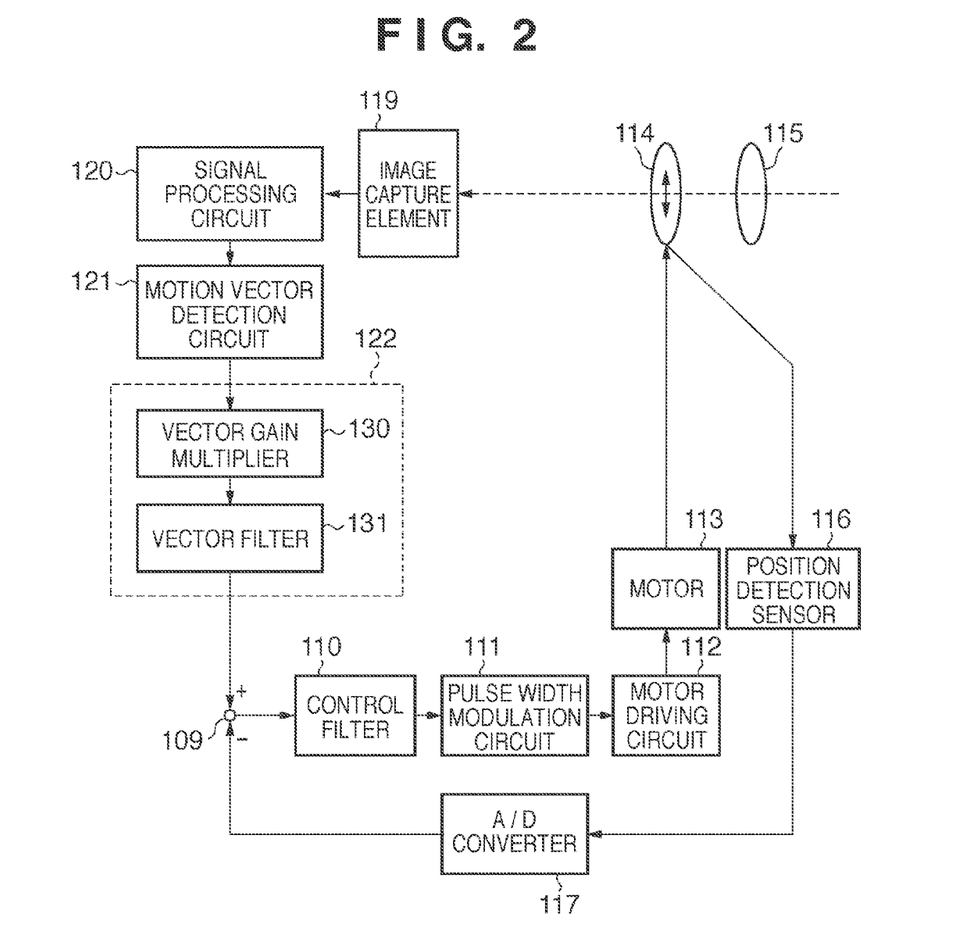
FIG. 2 is a block diagram for explaining the operation of a motion vector processor 122.

The motion vector processor 122 is configured by a vector gain multiplier 130 and vector filter 131, as shown in FIG. 2. The vector gain multiplier 130 multiplies a signal supplied from the motion vector detection circuit 121 by a predetermined gain, and supplies the product to the vector filter 131. The vector filter 131 makes, for example, differential and integration operations for data output from the vector gain multiplier 130, and supplies the result data to the adder/subtractor 109.

The vector gain multiplier 130 and vector filter 131 assume roles of deciding, for example, a response and oscillation margin upon reducing a correction residue in the feedback loop in FIG. 2. When the gain of the vector gain multiplier 130 is increased while the oscillation margin is assured, a correction residue becomes small; when the gain of the vector gain multiplier 130 is decreased in that state, a correction residue becomes large. In other words, when the gain of the vector gain multiplier 130 is increased, a blur correction effect is enhanced; when the gain of the vector gain multiplier 130 is decreased, the blur correction effect is reduced. The magnitude of the gain of the vector gain multiplier 130 is decided depending on determination states of a fixed point capturing determination unit 125 and panning controller 123.

Note that the motion vector detection circuit 121 detects a motion vector at a 60-Hz cycle in, for example, a video signal compliant with the NTSC format. In general, feedback control has to execute processing at a sampling frequency that is sufficiently higher than a signal frequency to be controlled, and can only control a frequency range as low as DC to several Hz at the 60-Hz cycle. Hence, a shake in a high-frequency range is corrected using the aforementioned gyro-based correction data, and that of low-frequency components as low as DC to several Hz, for which the detection precision lowers when the gyro-based correction data is used, is corrected using the vector-based correction data as the output from the motion vector processor 122. Thus, the blur correction performance can be improved.

Referring back to FIG. 1, the panning controller 123 determines whether or not the image capture apparatus is in a panning state when the user performs, for example, a panning operation of the image capture apparatus (panning determination). The panning controller 123 determines based on the angular velocity data output from the A/D converter 105 and the angular displacement data output from the integrator 107 whether or not the image capture apparatus is in the panning state. When the panning controller 123 judges that the image capture apparatus is in the panning state, it executes panning control.

Figure 3A:
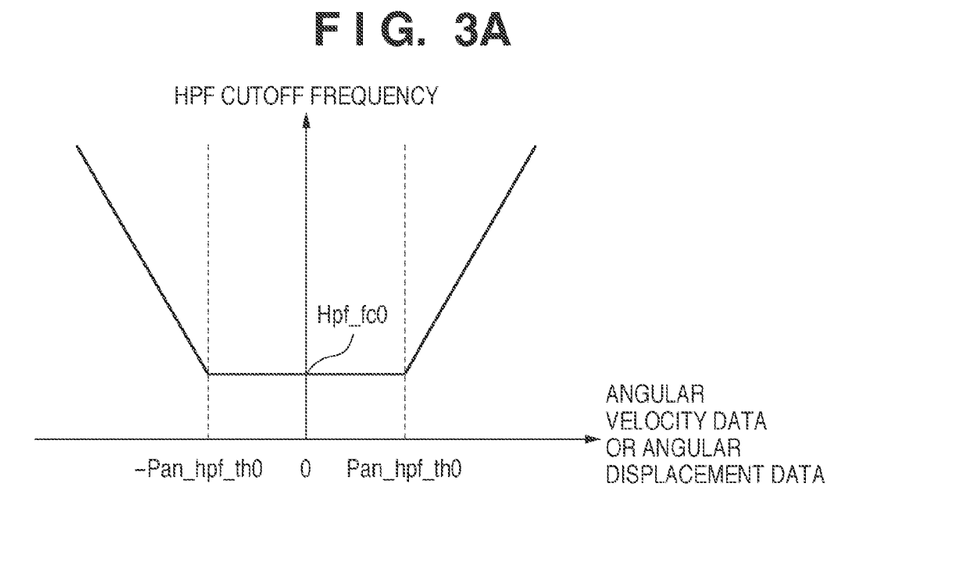
FIGS. 3A and 3B are graphs for explaining processing to be executed by a panning controller 123.
Figure 3B:
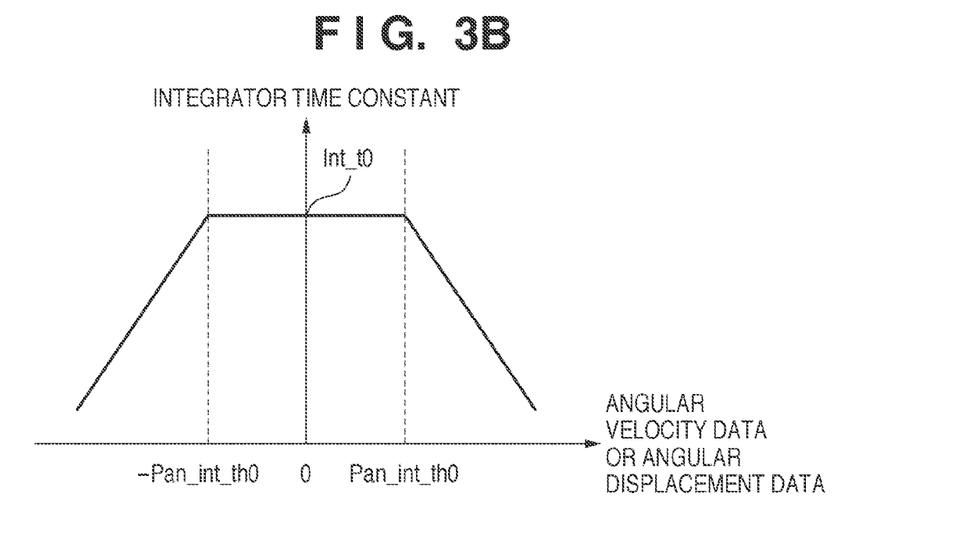

The determination processing as to whether or not the image capture apparatus is in the panning state, and the panning control will be described below with reference to the graphs shown in FIGS. 3A and 3B. In FIG. 3A, the abscissa plots the magnitude of angular velocity data or angular displacement data, and the ordinate plots a cutoff frequency of the HPF 106. In FIG. 3B, the abscissa plots the magnitude of angular velocity data or angular displacement data, and the ordinate plots a time constant of the integrator 107.

As shown in FIG. 3A, when the absolute value of the angular velocity data or angular displacement data is larger than a threshold Pan_hpf_th0 (first threshold), the panning controller 123 determines that the image capture apparatus is in the panning state. When the panning state is determined, the panning controller 123 sets the cutoff frequency of the HPF 106 (high-pass filter) to be a value larger than a cutoff frequency Hpf_fc0 used in a non-panning state in accordance with the magnitude of the angular velocity data or angular displacement data.

As shown in FIG. 3B, when the absolute value of the angular velocity data or angular displacement data is larger than a threshold Pan_int_th0, the panning controller 123 determines that the image capture apparatus is in the panning state. When the panning state is determined, the panning controller 123 sets the time constant of the integrator 107 to be a value smaller than a time constant Int_t0 used in a non-panning state in accordance with the magnitude of the angular velocity data or angular displacement data.

When the panning state is determined, the gain of the vector gain multiplier 130 is changed to a small value or zero, thus reducing an correction effect for a shake in a low-frequency range.

Assume that the panning control indicates control for setting the cutoff frequency of the HPF 106 to be a value larger than the cutoff frequency Hpf_fc0 used in a non-panning state, control for setting the time constant of the integrator 107 to be a value smaller than the time constant Int_t0 used in a non-panning state, and control for changing the gain of the vector multiplier 130 to a small value. With this panning control, a correction effect for a shake in a low-frequency range is reduced so as not to disturb the panning operation of the user.

A tripod capturing determination unit 126 determines based on the angular velocity data as the output from the A/D converter 105 whether or not the image capture apparatus 100 is set on a tripod. When the tripod capturing determination unit 126 determines that the image capture apparatus 100 is set on the tripod, blur correction control is stopped to hold the correction optical system 114 at the center of a movable range. The tripod setting determination can use a known method. For example, it is determined that the image capture apparatus is set on the tripod when a state in which the angular velocity data is less than or equal to a predetermined value continues for a predetermined time period or more.

A motion vector integrator 124 integrates motion vector data output from the motion vector detection circuit 121, and outputs vector integrated data to the fixed point capturing determination unit 125. The integration method includes various methods such as a method using a low-pass filter (LPF), and a method of summing up the output of the motion vector detection circuit 121 every unit time. Any of these methods may be adopted. The operation of the fixed point capturing determination unit 125 is processing as a characteristic feature of the present invention, and details of the operation will be described below.

First Embodiment

A first method of the processing to be executed by the fixed point capturing determination unit 125 in the image capture apparatus 100 shown in FIG. 1 as an example of the present invention will be described in detail below with reference to the drawings.

Figure 4:
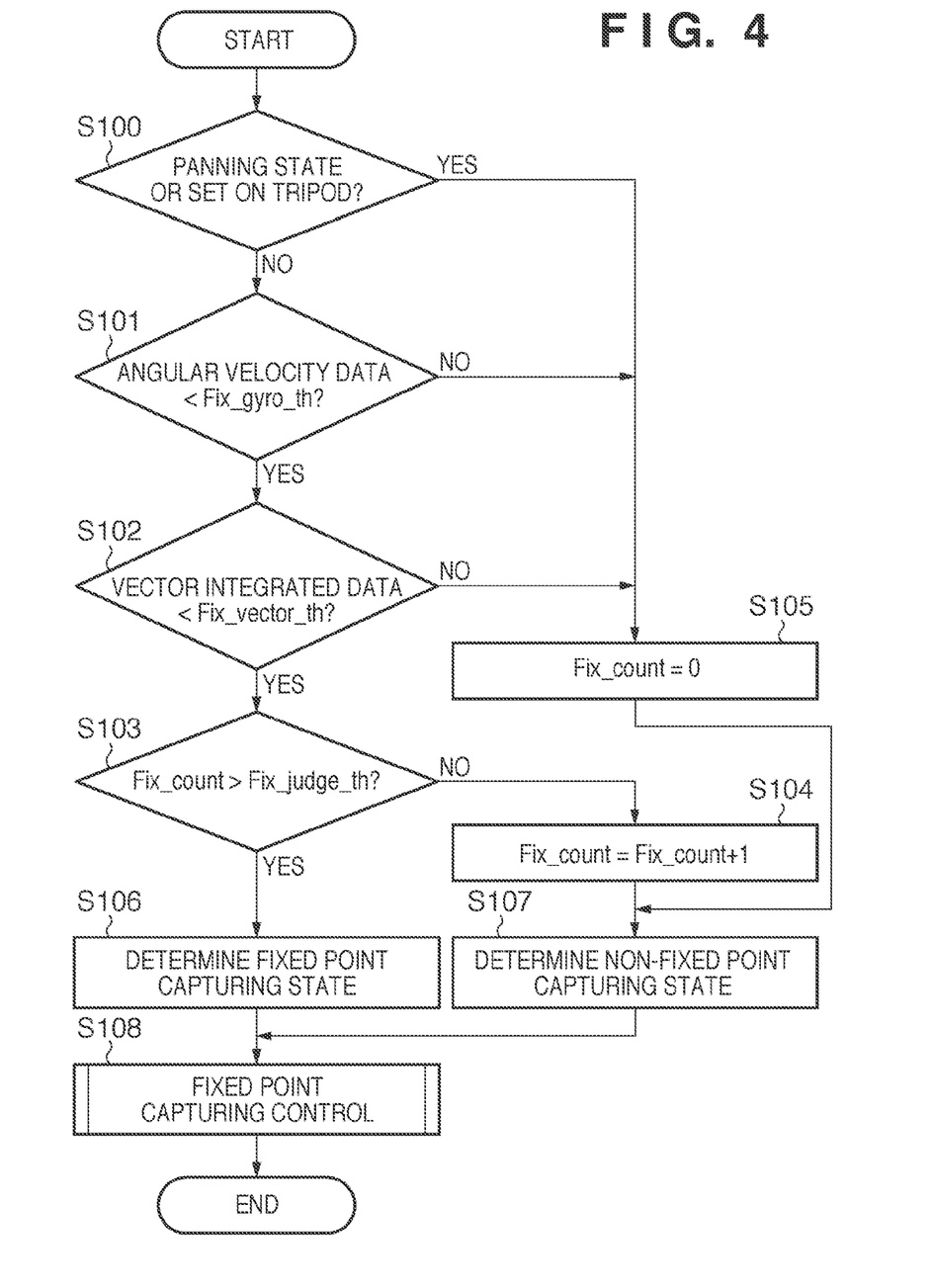
FIG. 4 is a flowchart for explaining processing to be executed by a fixed point capturing determination unit 125.

FIG. 4 is a flowchart showing the processing sequence of the fixed point capturing determination unit 125. The processing in the flowchart of FIG. 4 is repetitively executed at an interval of, for example, 1/60 sec. The fixed point capturing determination unit 125 determines in step S100 whether or not the panning controller 123 determines that the image capture apparatus is in the panning state, or the tripod capturing determination unit 126 determines that the apparatus is set on a tripod. If it is determined that the image capture apparatus is not in the panning state, and is not set on any tripod, the process advances to step S101.

The fixed point capturing determination unit 125 determines in step S101 whether or not the angular velocity data as the output from the A/D converter 105 is smaller than a threshold Fix_gyro_th. If the angular velocity data is smaller than the threshold Fix_gyro_th, the process advances to step S102.

The fixed point capturing determination unit 125 determines in step S102 whether or not the vector integrated data as the output from the motion vector integrator 124 is smaller than a threshold Fix_vector_th. If the vector integrated data is smaller than the threshold Fix_vector_th, the process advances to step S103.

The fixed point capturing determination unit 125 determines in step S103 whether or not a variable Fix_count exceeds a threshold Fix_judge_th. If the variable Fix_count does not exceed the threshold Fix_judge_th in step S103, the process advances to step S104 to count up the variable Fix_count. After the process in step S104, the process advances to step S107 to determine that the image capture apparatus is not in a fixed point capturing state (constant point capturing state).

If it is determined in step S100 that the image capture apparatus is in the panning state or it is set on the tripod, if it is determined in step S101 that the angular velocity data is greater than or equal to the threshold Fix_gyro_th, or if it is determined in step S102 that the vector integrated data is greater than or equal to the threshold Fix_vector_th, the process advances to step S105. In step S105, the fixed point capturing determination unit 125 clears the variable Fix_count to zero, and the process advances to step S107. In step S107, the fixed point capturing determination unit 125 determines that the image capture apparatus is not in the fixed point capturing state, as described above.

If the variable Fix_count exceeds the threshold Fix_judge_th in step S103, the process advances to step S106. In step S106, the fixed point capturing determination unit 125 determines that the image capture apparatus is in the fixed point capturing state.

Figure 6A:
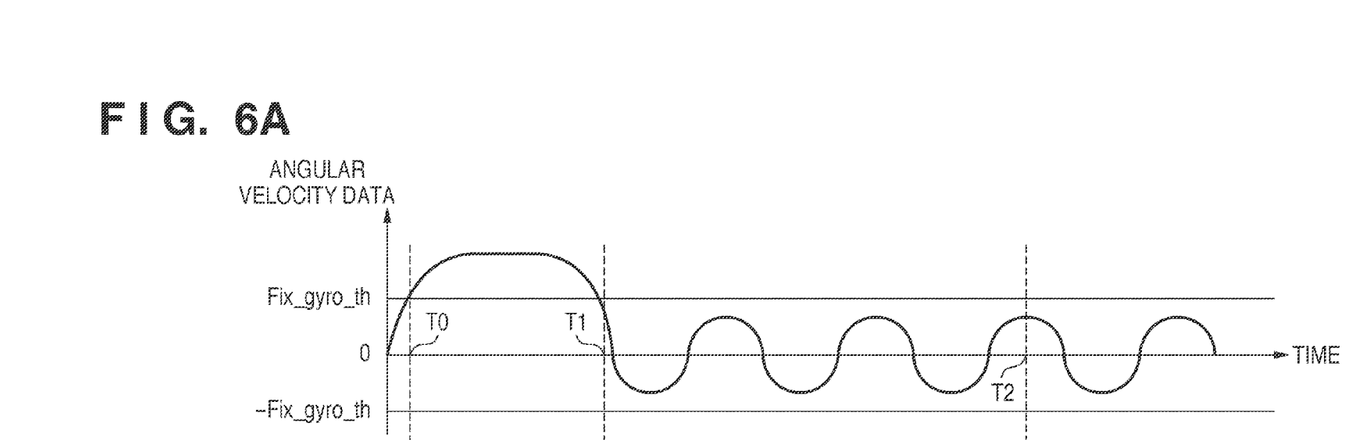
FIGS. 6A and 6B are graphs for explaining the processes in steps S101 and S102 in the flowchart shown in FIG. 4.
Figure 6B:
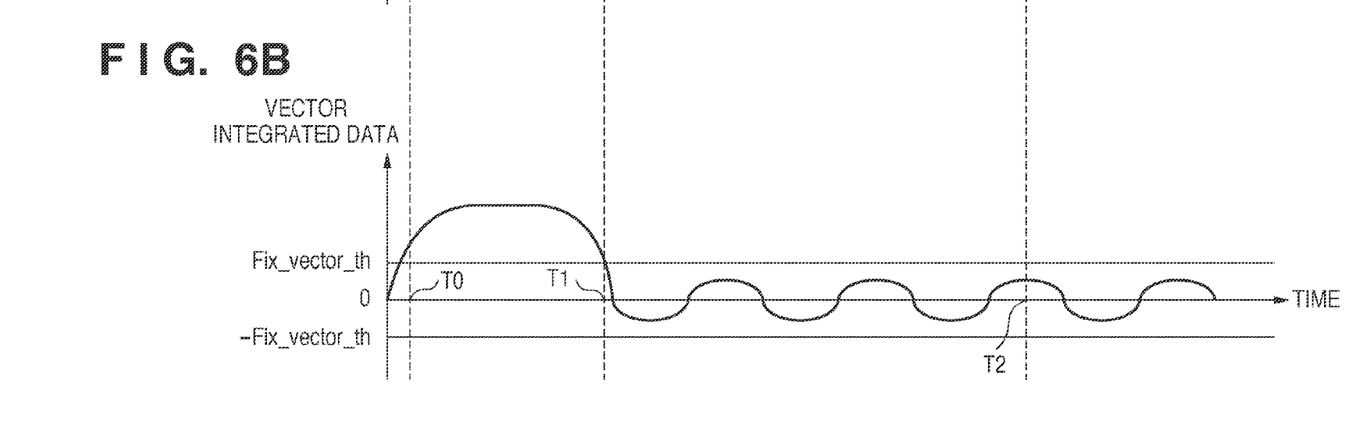

The processes in steps S100 to S107 in the flowchart of FIG. 4 will be described in more detail below with reference to the graphs shown in FIGS. 6A and 6B. FIG. 6A is a graph in which the ordinate plots the angular velocity data and the abscissa plots a time, and which shows a time-serial change in angular velocity data. FIG. 6B is a graph in which the ordinate plots the vector integrated data and the abscissa plots a time, and which shows a time-serial change in vector integrated data.

During a period between times T0 and T1, FIGS. 6A and 6B show states of changes in angular velocity data and vector integrated data when a large shake which cannot be corrected by the correction optical system 114 has occurred in the image capture apparatus. At this time, the angular velocity data exceeds the threshold Fix_gyro_th, as shown in FIG. 6A, or the vector integrated data also exceeds the threshold Fix_vector_th, as shown in FIG. 6B. For this reason, "NO" is determined in step S101 or S102 in the flowchart of FIG. 4.

After that, the variable Fix_count is cleared to zero in step S105, and the fixed point capturing determination unit 125 determines in step S107 that the image capture apparatus is not in the fixed point capturing state. That is, when the angular velocity data or vector integrated data is large, the fixed point capturing determination unit 125 estimates that the movement of the image capture apparatus is large, and determines that the image capture apparatus does not capture a fixed point.

After the time T1, FIGS. 6A and 6B show states of changes in angular velocity data and vector integrated data when a fixed point capturing operation is performed. In the fixed point capturing state, the angular velocity data is stably output to always fall below the threshold Fix_gyro_th, as shown in FIG. 6A. Also, the vector integrated data is stably output to always fall below the threshold Fix_vector_th. For this reason, "YES" is determined in steps S101 and S102 in the flowchart of FIG. 4. In step S103, the fixed point capturing determination unit 125 determines whether or not a time period in which the angular velocity data and vector integrated data continuously fall below the thresholds exceeds a predetermined time period decided by the Fix_judge_th with respect to the variable Fix_count. If the predetermined time period is not exceeded, the variable Fix_count is counted up in step S104 until the predetermined time period is exceeded. If the time period in which the angular velocity data and vector integrated data continuously fall below the thresholds exceeds the predetermined time period (continues over the predetermined time period) in step S103, the fixed point capturing determination unit 125 determines in step S106 that the image capture apparatus is in the fixed point capturing state. That is, when a time period in which the angular velocity data and vector integrated data are small continues, since the user is more likely to capture a fixed object, the fixed point capturing determination unit 125 determines that a fixed point is captured.

Letting T2−T1 be the predetermined time period decided by the threshold Fix_judge_th with respect to the variable Fix_count in FIGS. 6A and 6B, a non-fixed point capturing state is determined before the time T2, and the fixed point capturing state is determined after the time T2.

After the fixed point capturing determination is made in step S106 or S107, the process advances to step S108 to execute control (fixed point capturing control) depending on the fixed point capturing state or non-fixed point capturing state.

Figure 5:
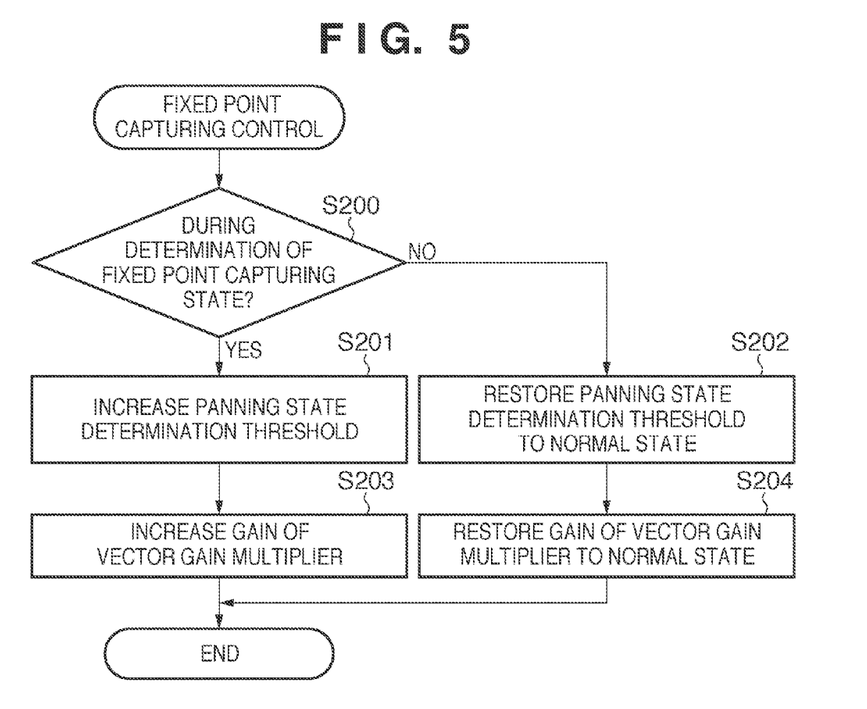
FIG. 5 is a flowchart for explaining detailed processing in step S108 in the flowchart shown in FIG. 4 according to the first embodiment of the present invention.

FIG. 5 is a flowchart of the fixed point capturing control in step S108. In the flowchart of FIG. 5, it is determined in step S200 whether or not the fixed point capturing state is determined. If the fixed point capturing state is determined in step S106, the process advances to step S201.

In the process in step S201, the threshold used in the panning controller 123 to determine whether or not the image capture apparatus is in the panning state is increased. The process in step S201 will be described below with reference to the graphs shown in FIGS. 7A and 7B.

Figure 7A:
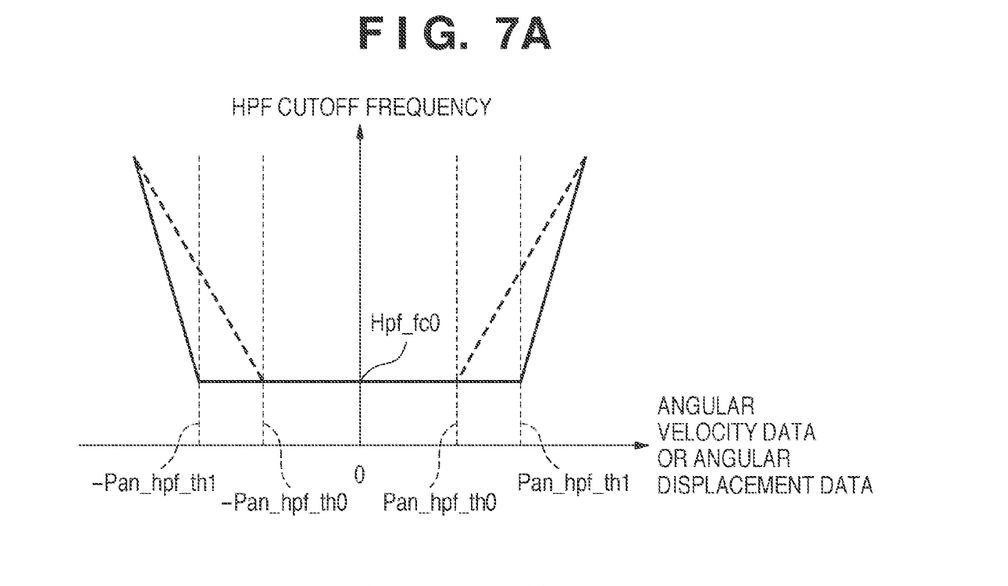
FIGS. 7A and 7B are graphs for explaining the processes in steps S201 and S202 in the flowchart shown in FIG. 5.
Figure 7B:
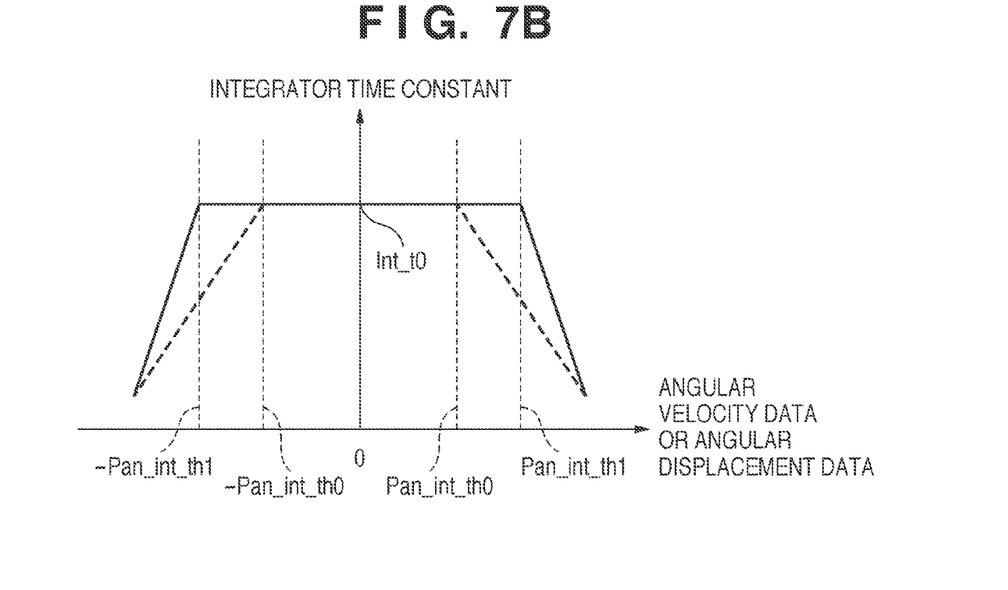

In FIG. 7A, the abscissa plots the magnitude of angular velocity data or angular displacement data, and the ordinate plots the cutoff frequency of the HPF 106, as in FIG. 3A. In FIG. 7B, the abscissa plots the magnitude of angular velocity data or angular displacement data, and the ordinate plots a time constant of the integrator 107, as in FIG. 3B.

A solid line graph in FIG. 7A shows a change in cutoff frequency of the HPF 106 with respect to the angular velocity data or angular displacement data while the fixed point capturing state is determined. A dotted line graph in FIG. 7A is the same as that in FIG. 3A, that is, it shows a change in cutoff frequency of the HPF 106 with respect to the angular velocity data or angular displacement data while the fixed point capturing state is not determined.

While the fixed point capturing state is not determined, the panning controller 123 determines that the image capture apparatus is in the panning state when the absolute value of the angular velocity data or angular displacement data becomes larger than the threshold Pan_hpf_th0. On the other hand, while the fixed point capturing state is determined, the threshold is changed to a value Pan_hpf_th1 (second threshold) larger than the threshold Pan_hpf_th0 (first threshold) (control change), so as to harder to determine the panning state.

A solid line graph in FIG. 7B shows a change in time constant of the integrator 107 with respect to the angular velocity data or angular displacement data while the fixed point capturing state is determined. A dotted line graph in FIG. 7B is the same as that in FIG. 3B, that is, it shows a change in time constant of the integrator 107 with respect to the angular velocity data or angular displacement data while the fixed point capturing state is not determined.

While the fixed point capturing state is not determined, the panning controller 123 determines that the image capture apparatus is in the panning state when the absolute value of the angular velocity data or angular displacement data becomes larger than the threshold Pan_int_th0. On the other hand, while the fixed point capturing state is determined, the threshold is changed to a value Pan_int_th1 larger than the threshold Pan_int_th0, so as to harder to determine the panning state.

As a result, a phenomenon that the panning state is determined in the fixed point capturing state although the user does not pan the image capture apparatus, and an image blur becomes large due to a residual shake in a low-frequency range can be eliminated.

After the process in step S201, the process advances to step S203. In step S203, the gain of the vector gain multiplier 130, which has been explained using the block diagram of FIG. 2, is changed to be a value larger than the gain used while the fixed point capturing state is not determined. As a result, in the fixed point capturing state, a correction effect for a shake in a low-frequency region is enhanced, and a high-quality image which suffers less blur can be captured. After the process in step S203, the processes in the flowcharts shown in FIGS. 4 and 5 end.

If it is determined in step S200 that a non-fixed point capturing state is determined in step S107, the process advances to step S202. If the threshold used to determine the panning state is increased in step S201, processing for restoring it to an original threshold is executed in step S202. That is, in FIGS. 7A and 7B, the solid line graphs are changed to the dotted line graphs. After step S202, the process advances to step S204. If the gain of the vector gain multiplier 130 is increased in step S203, processing for restoring it to an original gain is executed in step S204.

It is very effective for the fixed point capturing operation to increase the threshold used to determine the panning state and to increase the gain of the vector gain multiplier 130 in the processes in steps S201 and S203. However, in a capturing operation in which panning is frequently made, the following trouble occurs. That is, since a correction effect for a shake in the low-frequency range is large, and panning determination is delayed, the correction optical system 114 contacts the end of the movable range to disable blur correction at a higher frequency. The aforementioned processes in steps S202 and S204 are executed to avoid such trouble. After the process in step S204, the processes in the flowcharts shown in FIGS. 4 and 5 end.

As described above, according to the first embodiment of the present invention, whether or not the image capture apparatus is in the fixed point capturing state is determined. When the fixed point capturing state is determined, control dedicated to the fixed point capturing state is executed to especially enhance a blur correction effect in the low-frequency range, and to improve blur correction performance.

Second Embodiment

A second method of the processing to be executed by the fixed point capturing determination unit 125 in the image capture apparatus 100 shown in FIG. 1 as an example of the present invention will be described in detail below with reference to the drawings.

Figure 8:
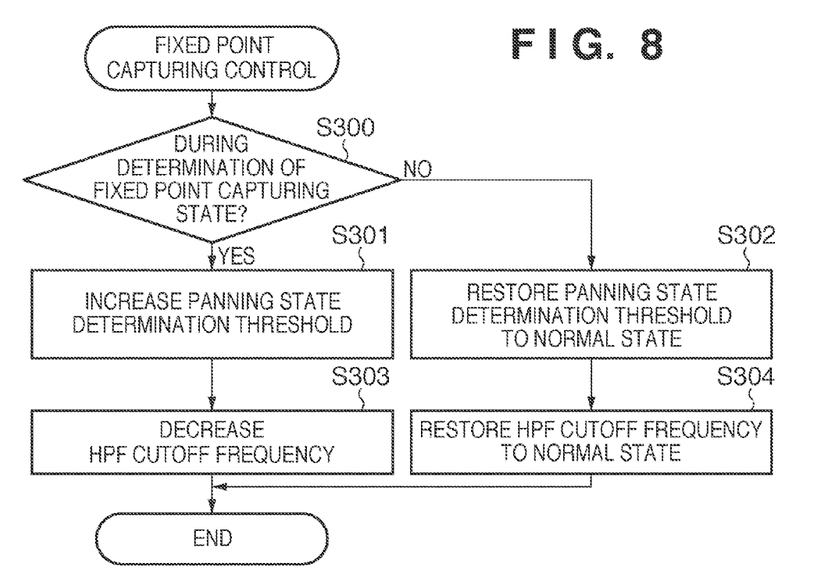
FIG. 8 is a flowchart for explaining detailed processing in step S108 in the flowchart shown in FIG. 4 according to the second embodiment of the present invention.

A difference between the processing of this embodiment and that of the first embodiment is that the operation of the fixed point capturing control in step S108 in FIG. 4 is changed from FIG. 5 to FIG. 8. Hence, a description of the flowchart of FIG. 4 will not be given, and the flowchart of FIG. 8 will be explained. In the flowchart of FIG. 8, since processes in steps S300 to S302 are the same as those in steps S200 to S202 in FIG. 5, a description thereof will not be repeated.

In the flowchart of FIG. 8, if a fixed point capturing state is determined in step S300, the process advances to step S301. Then, the threshold used to determine whether or not the image capture apparatus is in a panning state is increased in step S301, and the process advances to step S303.

In the process in step S303, the cutoff frequency of the HPF 106 is changed to a value smaller than that used while the fixed point capturing state is not determined. The processes in steps S301 and S303 will be described below with reference to the graph shown in FIG. 10A.

Figure 10A:
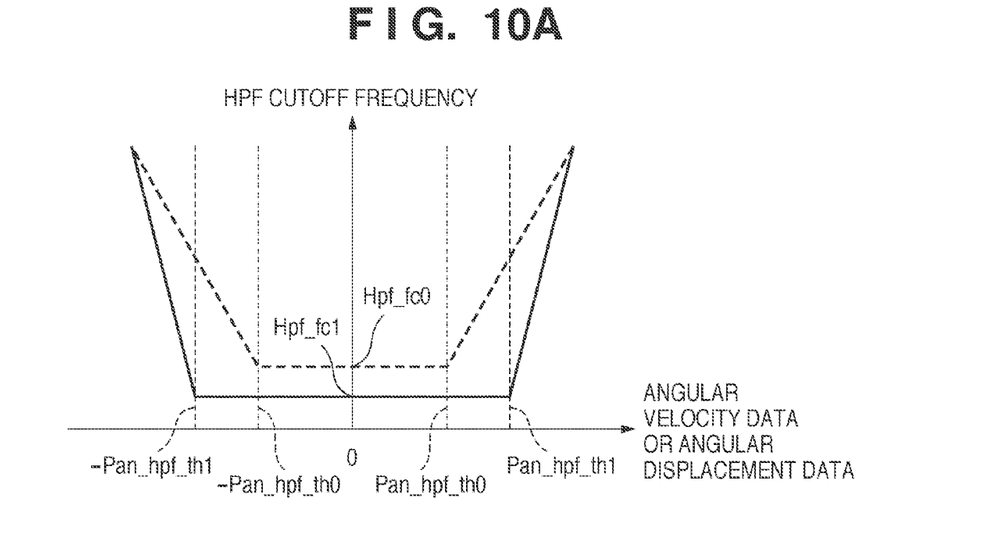
FIGS. 10A and 10B are graphs for explaining the processes in steps S301 and S303, and those in steps S401 and S403 in the flowcharts shown in FIGS. 8 and 9.

In FIG. 10A, the abscissa plots the magnitude of angular velocity data or angular displacement data, and the ordinate plots a cutoff frequency of the HPF 106, as in FIG. 3A. A solid line graph in FIG. 10A shows a change in cutoff frequency of the HPF 106 with respect to the angular velocity data or angular displacement data while the fixed point capturing state is determined. A dotted line graph in FIG. 10A is the same as that in FIG. 3A, that is, it shows a change in cutoff frequency of the HPF 106 with respect to the angular velocity data or angular displacement data while the fixed point capturing state is not determined.

In the process in step S301, the threshold used to determine the panning state is increased from Pan_hpf_th0 to Pan_hpf_th1. In the process in step S303, as shown in FIG. 10A, the cutoff frequency of the HPF 106 is changed from a value Hpf_fc0 used when the image capture apparatus is not in the panning state to a value Hpf_fc1 smaller than Hpf_fc0 (the cutoff frequency is shifted to the low-frequency side). As a result, a correction effect for a shake in the low-frequency range is enhanced, and a high-quality image which suffers less blur can be captured. After the process in step S303, the processes of the flowcharts of FIGS. 4 and 8 end.

In the flowchart of FIG. 8, if the fixed point capturing state is not determined in step S300, the process advances to step S302. If the threshold used to determine the panning state is increased in step S301, processing for restoring it to an original threshold is executed in step S302, and the process then advances to step S304. If the cutoff frequency of the HPF 106 used when the image capture apparatus is not in the panning state is changed to the smaller value in the process in step S303, processing for restoring it to an original value is executed in step S304. That is, in FIG. 10A, the cutoff frequency of the HPF 106 is changed from Hpf_fc1 to Hpf_fc0.

It is very effective for the fixed point capturing operation to increase the threshold used to determine the panning state and to decrease the cutoff frequency of the HPF 106 in the processes in steps S301 and S303. However, in a capturing operation in which panning is frequently made, the following trouble occurs. That is, since a correction effect for a shake in the low-frequency range is large, and panning determination is delayed, the correction optical system 114 contacts the end of the movable range to disable blur correction at a higher frequency. The aforementioned processes in steps S302 and S304 are executed to avoid such trouble. After the process in step S304, the processes in the flowcharts shown in FIGS. 4 and 8 end.

As described above, according to the second embodiment, whether or not the image capture apparatus is in the fixed point capturing state is determined. When the fixed point capturing state is determined, control dedicated to the fixed point capturing state is executed to especially enhance a blur correction effect in the low-frequency range, and to improve blur correction performance.

Third Embodiment

Figure 9:
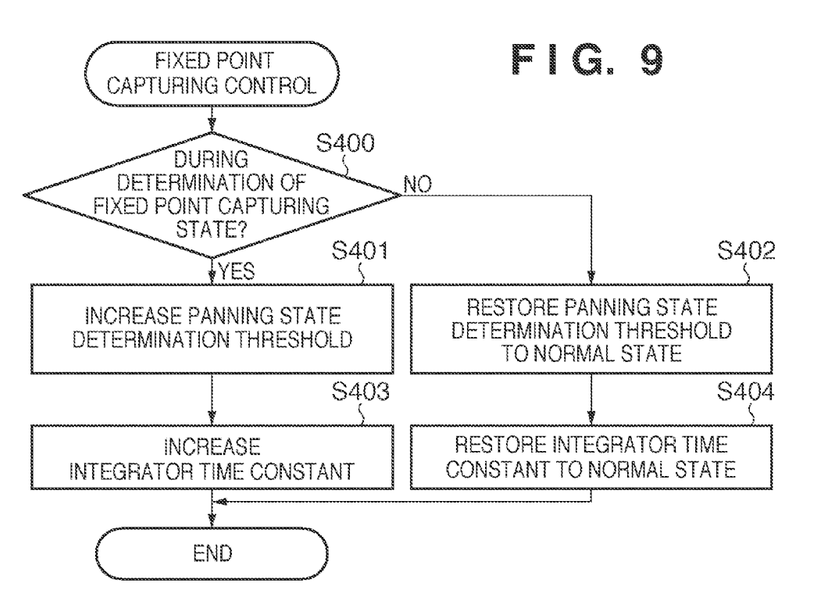
FIG. 9 is a flowchart for explaining detailed processing in step S108 in the flowchart shown in FIG. 4 according to the third embodiment of the present invention.

A third method of the processing to be executed by the fixed point capturing determination unit 125 in the image capture apparatus 100 shown in FIG. 1 as an example of the present invention will be described in detail below with reference to the drawings. A difference between the processing of this embodiment and that of the first embodiment is that the operation of the fixed point capturing control in step S108 in FIG. 4 is changed from FIG. 5 to FIG. 9. Hence, a description of the flowchart of FIG. 4 will not be given, and the flowchart of FIG. 9 will be explained. In the flowchart of FIG. 9, since processes in steps S400 to S402 are the same as those in steps S200 to S202 in FIG. 5, a description thereof will not be repeated.

In the flowchart of FIG. 9, if a fixed point capturing state is determined in step S400, the process advances to step S401. Then, the threshold used to determine whether or not the image capture apparatus is in a panning state is increased in step S401, and the process advances to step S403.

In the process in step S403, the time constant of the integrator 107 is changed to a value larger than that used while the fixed point capturing state is not determined. The processes in steps S401 and S403 will be described below with reference to the graph shown in FIG. 10B.

Figure 10B:
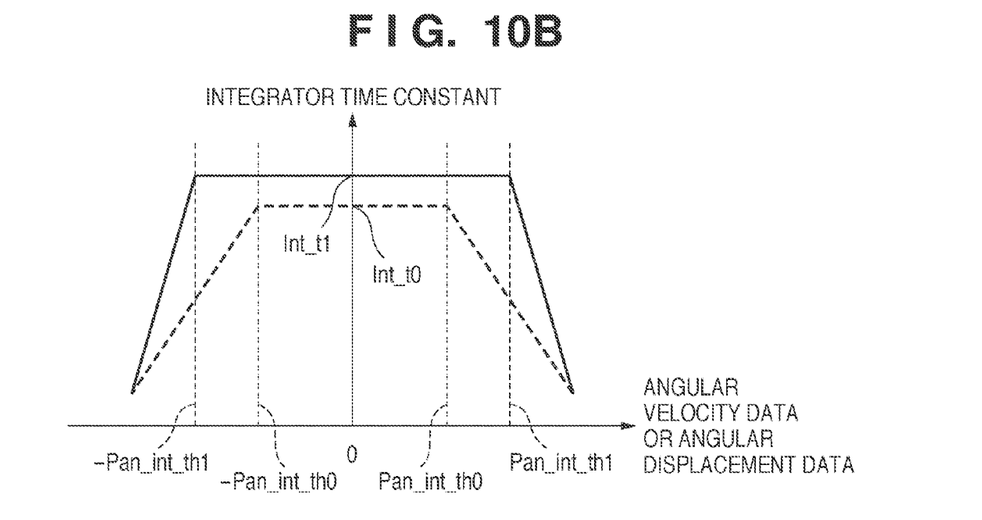

In FIG. 10B, the abscissa plots the magnitude of angular velocity data or angular displacement data, and the ordinate plots the time constant of the integrator 107, as in FIG. 3B. A solid line graph in FIG. 10B shows a change in time constant of the integrator 107 with respect to the angular velocity data or angular displacement data while the fixed point capturing state is determined. A dotted line graph in FIG. 10B is the same as that in FIG. 3B, that is, it shows a change in time constant of the integrator 107 with respect to the angular velocity data or angular displacement data while the fixed point capturing state is not determined.

In the process in step S401, the threshold used to determine the panning state is increased from Pan_int_th0 to Pan_int_th1. In the process in step S403, as shown in FIG. 10B, the time constant of the integrator 107 is changed from a value Int_t0 used when the image capture apparatus is not in the panning state to a value Int_t1 larger than Int_t0. As a result, a correction effect for a shake in the low-frequency range is enhanced, and a high-quality image which suffers less blur can be captured. After the process in step S403, the processes of the flowcharts of FIGS. 4 and 9 end.

In the flowchart of FIG. 9, if the fixed point capturing state is not determined in step S400, the process advances to step S402. If the threshold used to determine the panning state is increased in step S401, processing for restoring it to an original threshold is executed in step S402, and the process then advances to step S404. If the time constant of the integrator 107 used when the image capture apparatus is not in the panning state is changed to the larger value in the process in step S403, processing for restoring it to an original value is executed in step S404. That is, in FIG. 10B, the time constant of the integrator 107 is changed from Int_t1 to Int_t0.

It is very effective for the fixed point capturing operation to increase the threshold used to determine the panning state and to increase the time constant of the integrator 107 in the processes in steps S401 and S403. However, in a capturing operation in which panning is frequently made, the following trouble occurs. That is, since a correction effect for a shake in the low-frequency range is large, and panning determination is delayed, the correction optical system 114 contacts the end of the movable range to disable blur correction at a higher frequency. The aforementioned processes in steps S402 and S404 are executed to avoid such trouble. After the process in step S404, the processes in the flowcharts shown in FIGS. 4 and 9 end.

As described above, according to the third embodiment, whether or not the image capture apparatus is in the fixed point capturing state is determined. When the fixed point capturing state is determined, control dedicated to the fixed point capturing state is executed to especially enhance a blur correction effect in the low-frequency range, and to improve blur correction performance.

Note that the motion vector detection circuit 121, motion vector processor 122, and motion vector integrator 124 are not indispensable components in the second and third embodiments of the present invention, and the blur correction operation may be performed using only the output from the angular velocity sensor 102. In this case, the process in step S102 in FIG. 4 is omitted.

Also, both of the processes in steps S101 and S102 in FIG. 4 need not always be executed. The fixed point capturing determination may be executed using only the angular velocity data or only the vector integrated data.

The fixed point capturing determination operation based on the angular velocity data in step S101 in FIG. 4 is an example, and the present invention is not limited to this. For example, in place of the angular velocity data, any of the output from the HPF 106, that from the integrator 107, and that from the focal length correction unit 108 may be used as long as they assume values based on the output from the angular velocity sensor 102. Also, a value that undergoes operations dedicated to the fixed point capturing determination (for example, angular velocity data values may be averaged) may be used.

When the three embodiments of the present invention are practiced in combination, a blur correction effect in the fixed point capturing state can be further enhanced, and the blur correction performance can be further improved. For example, in the flowchart of FIG. 5, the processes in steps S303 and S403 may be executed after the process in step S203, and the processes in steps S304 and S404 may be executed after the process in step S204.

The correction optical system 114 (for example, a shift lens) has been exemplified as a component that attains blur correction. However, the present invention is not limited to this. For example, a method of driving a variable angle prism (VAP) or image capture element in a direction perpendicular to the optical axis may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-148028, filed Jun. 29, 2010 which is hereby incorporated by reference herein in its entirety.

What is claimed is:

1. An image capture apparatus comprising:
a shake detection unit which detects a shake of said image capture apparatus;
a motion vector detection unit which detects a motion vector indicating a movement of an image from a captured image signal;
a first calculation unit which calculates a first shake correction amount based on an output from said shake detection unit;
a second calculation unit which calculates a second shake correction amount based on an output from said motion vector detection unit;
a shake correction unit which optically corrects a blur of a captured image based on the first shake correction amount and the second shake correction amount;
a panning determination unit which determines that said image capture apparatus performs a panning operation when a signal obtained based on the output from said shake detection unit is larger than a first threshold;
a determination unit which determines whether or not said image capture apparatus is in a constant point capturing state in which a constant position is captured; and
a control change unit which changes the first threshold to a second threshold larger than the first threshold and amplifies the second shake correction amount when said determination unit determines that said image capture apparatus is in the constant point capturing state.

2. The apparatus according to claim 1, wherein said first calculation unit includes a high-pass filter, and
said control change unit further shifts a cutoff frequency of said high-pass filter to a low-frequency side while said determination unit determines the constant point capturing state.

3. The apparatus according to claim 1, wherein said first calculation unit includes an integration unit, and
said control change unit further increases a time constant of said integration unit while said determination unit determines the constant point capturing state.

4. The apparatus according to claim 1, wherein said determination unit determines the constant point capturing state when a state in which the signal obtained based on the output from said shake detection unit is smaller than a predetermined threshold continues for not less than a predetermined time period, or when a time period in which the signal obtained based on the output from said motion vector detection unit is smaller than the predetermined threshold continues for not less than a predetermined time period.

5. An image capture apparatus comprising:
a shake detection unit which detects a shake of said image capture apparatus;
a calculation unit which calculates a shake correction amount based on an output from said shake detection unit;
a shake correction unit which optically corrects a blur of a captured image based on the shake correction amount;

a panning determination unit which determines that said image capture apparatus performs a panning operation when a signal obtained based on the output from said shake detection unit is larger than a first threshold;

a determination unit which determines whether or not said image capture apparatus is in a constant point capturing state in which a constant position is captured; and a control change unit which changes the first threshold to a second threshold larger than the first threshold and shifts a cutoff frequency of a high-pass filter included in said calculation unit to a low-frequency side when said determination unit determines that said image capture apparatus is in the constant point capturing state.

6. The apparatus according to claim 5, wherein said calculation unit includes an integration unit, and said control change unit further increases a time constant of said integration unit while said determination unit determines that said image capture apparatus is in the constant point capturing state.

7. An image capture apparatus comprising:

a shake detection unit which detects a shake of said image capture apparatus;

a calculation unit which calculates a shake correction amount based on an output from said shake detection unit;

a shake correction unit which optically corrects a blur of a captured image based on the shake correction amount;

a panning determination unit which determines that said image capture apparatus performs a panning operation when a signal obtained based on the output from said shake detection unit is larger than a first threshold;

a determination unit which determines whether or not said image capture apparatus is in a constant point capturing state in which a constant position is captured; and a control change unit which changes the first threshold to a second threshold larger than the first threshold and increases a time constant of an integration unit included in said calculation unit when said determination unit determines that said image capture apparatus is in the constant point capturing state.

8. The apparatus according to claim 7, wherein said determination unit determines the constant point capturing state when a state in which the signal obtained based on the output from said shake detection unit is smaller than a predetermined threshold continues for not less than a predetermined time period.

9. A control method of an image capture apparatus, comprising:

a shake detection step of detecting a shake of the image capture apparatus;

a motion vector detection step of detecting a motion vector indicating a movement of an image from a captured image signal;

a first calculation step of calculating a first shake correction amount based on an output in the shake detection step;

a second calculation step of calculating a second shake correction amount based on an output in the motion vector detection step;

a shake correction step of optically correcting a blur of a captured image based on the first shake correction amount and the second shake correction amount;

a panning determination step of determining that the image capture apparatus performs a panning operation when a signal obtained based on the output in the shake detection step is larger than a first threshold;

a determination step of determining whether or not the image capture apparatus is in a constant point capturing state in which a constant position is captured; and a control change step of changing the first threshold to a second threshold larger than the first threshold and amplifying the second shake correction amount when the constant point capturing state is determined in the determination step.

10. A control method of an image capture apparatus, comprising:

a shake detection step of detecting a shake of the image capture apparatus;

a calculation step of calculating a shake correction amount based on an output in the shake detection step;

a shake correction step of optically correcting a blur of a captured image based on the shake correction amount;

a panning determination step of determining that the image capture apparatus performs a panning operation when a signal obtained based on the output in the shake detection step is larger than a first threshold;

a determination step of determining whether or not the image capture apparatus is in a constant point capturing state in which a constant position is captured; and a control change step of changing the first threshold to a second threshold larger than the first threshold and shifting a cutoff frequency of a high-pass filter in the calculation step to a low-frequency side when the constant point capturing state is determined in the determination step.

11. A control method of an image capture apparatus, comprising:

a shake detection step of detecting a shake of the image capture apparatus;

a calculation step of calculating a shake correction amount based on an output in the shake detection step;

a shake correction step of optically correcting a blur of a captured image based on the shake correction amount;

a panning determination step of determining that the image capture apparatus performs a panning operation when a signal obtained based on the output in the shake detection step is larger than a first threshold;

a determination step of determining whether or not the image capture apparatus is in a constant point capturing state in which a constant position is captured; and a control change step of changing the first threshold to a second threshold larger than the first threshold and increasing a time constant of an integration step in the calculation step when the constant point capturing state is determined in the determination step.

* * * * *